Dec. 24, 1968   T. H. BRUMAGIN ET AL   3,417,930
APPARATUS FOR TREATING ALUMINUM DROSS
Filed April 13, 1965   2 Sheets-Sheet 1

INVENTOR.
Thomas H. Brumagin
BY Stanley H. Brown
J. D. Douglass
Their atty.

United States Patent Office 3,417,930
Patented Dec. 24, 1968

3,417,930
APPARATUS FOR TREATING ALUMINUM DROSS
Thomas H. Brumagin, Westfield, N.Y., and Stanley H. Brown, Newark, Ohio, assignors to Ajax-Newark, Inc., Westfield, N.Y., a corporation of New York
Filed Apr. 13, 1965, Ser. No. 447,725
14 Claims. (Cl. 241—64)

ABSTRACT OF THE DISCLOSURE

Apparatus for disintegrating and cooling aluminum dross having a vibrating conveyor and a rotary flail intermediate the ends of the conveyor.

Figures 1, 2:
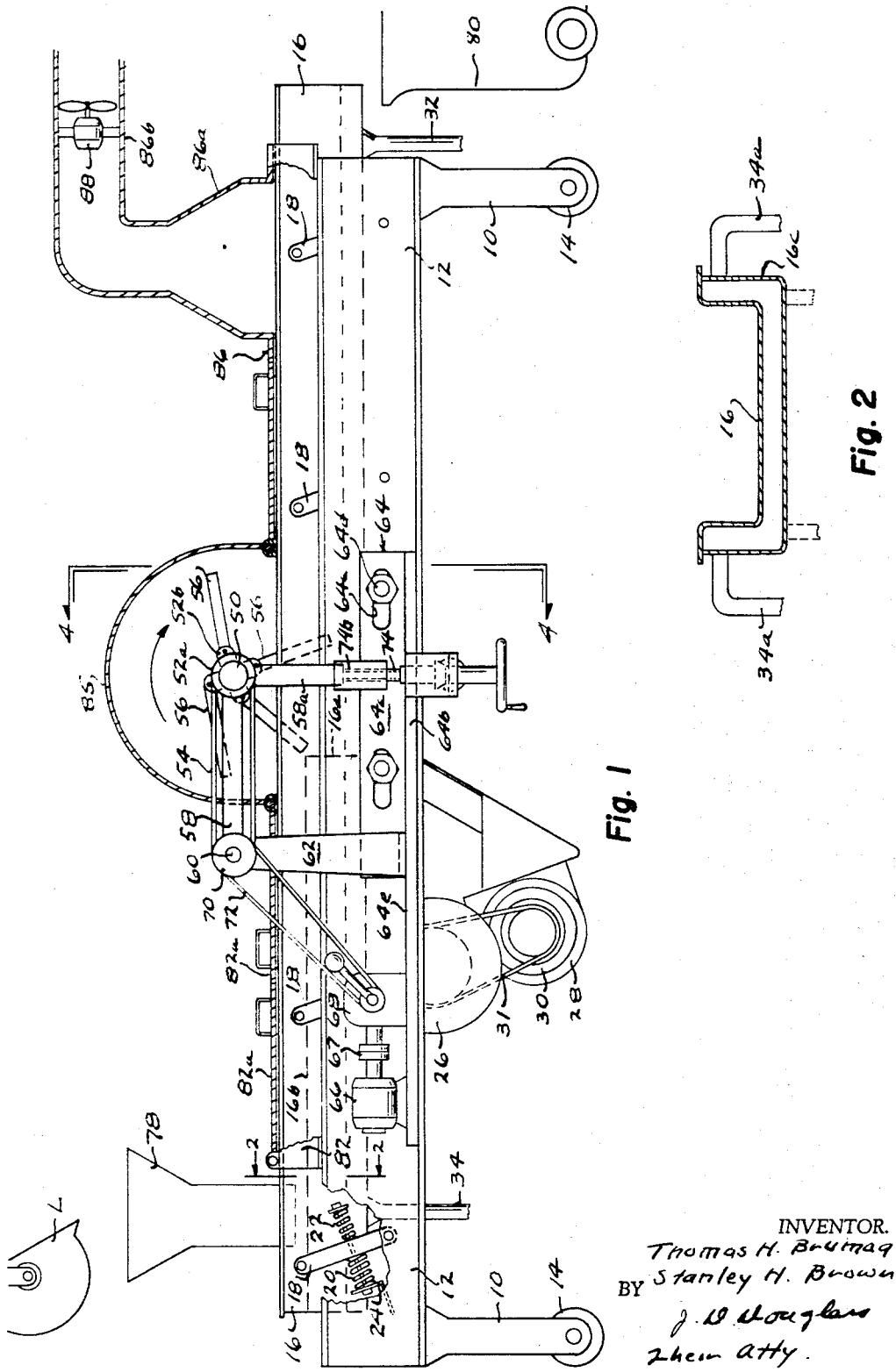

This invention relates to improvements in methods and apparatus for treating the residue from the refinement of metals and more particularly the treatment of the dross from such metals as aluminum.

As is well known to those versed in the art, when certain metals are refined, or melted, there is a scum (commonly called "dross") that forms on the top of the metal. This dross consists of certain impurities that separate from the metal but which are largely oxides of the metal itself; if the metal is aluminum such scum is mostly aluminum oxide. This material must be removed so that it does not form inclusions in the metal, and once removed becomes a disposal problem. The dross is present, particularly in aluminum, in the original recovery process, in the melting of aluminum pig and/or scrap, or, in the alloying and refining processes. It forms on top of the metal in the place where it is being melted in the furnace or the melting pot. It is common practice to skim the dross off the molten metal, place it in a tote box and then cart it to a place of storage or ultimate disposal.

One of the primary problems in the handling of dross is the fact that it is exothermic and consequently after removal an exothermic reaction takes place which continues for long periods of time until the components which cause the exothermic reaction are consumed. This makes it difficult and frequently extremely dangerous to handle and requires that the material be allowed to set for hours before it can ultimately be disposed of.

During the melting process there is also a considerable amount of the metal entrapped in the dross and this is raked off with the removal of the dross. The exothermic reaction causes this metal to be converted to oxides which results in a loss of the metal.

The resultant product is in the form of a slag, frequently in large lumps which are extremely difficult to disintegrate. This further complicates the disposal.

In some instances it has been proposed to place the dross in a rotating container and allow, or even promote the exothermic reaction to cause a coalescing of the metallic aluminum which is drained off, as in Patent 2,481,591. This causes a loss of the desired metal. After the usable metal is removed the remaining metal is discharged and it cools in the form of lumps that are still difficult to handle.

Another device, as disclosed in Patent 1,615,009, places the dross in an inclined conveyer where it is conveyed upward by a screw and angular propeller blades. The blades are supposed to cause the molten metal to be separated from the dross, which metal flows down and out the bottom and the dross discharged at the top. The dross is still of such character that it agglomerates and there is therefore still the problem of disposal.

In the above patents the principal object was the recovery of the aluminum metal and not the treatment of the dross to make it ultimately easier to handle.

The present invention is concerned with the treatment of the dross, to cool it and disintegrate the lumps at the same time. The combination of the two causes the cooling to proceed at a rapid rate and prevent the wasting of the metal ordinarily consumed by the exothermic reaction. The disintegration or comminution of the metal puts it in a condition for further treatment for the efficient removal of the free metal and for the disposal of the residue. The material, at the end of the process, is in a highly finely divided state which enables the further processes to be carried out without any further crushing apparatus.

Still other advantages of the invention and the invention itself will become more apparent from the following description of one form of apparatus wherein the method may be carried out.

Figure 3:
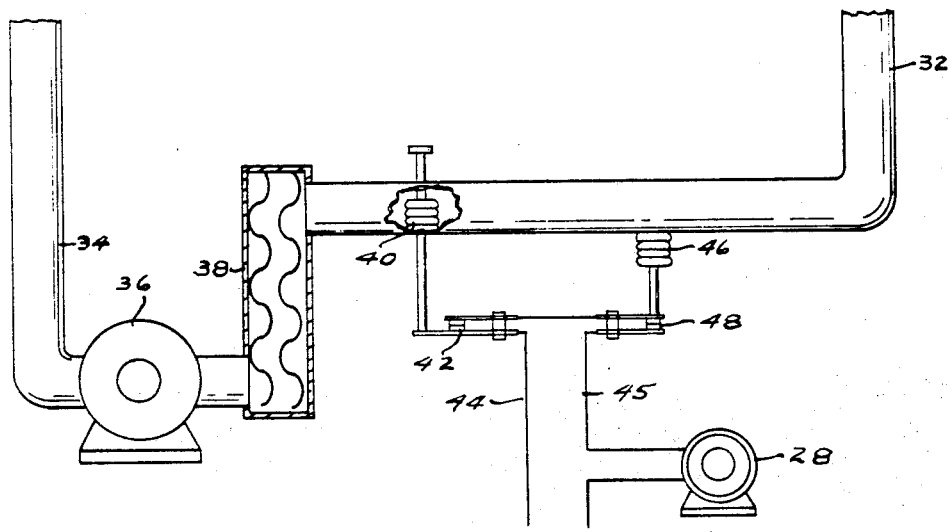
Figure 4:
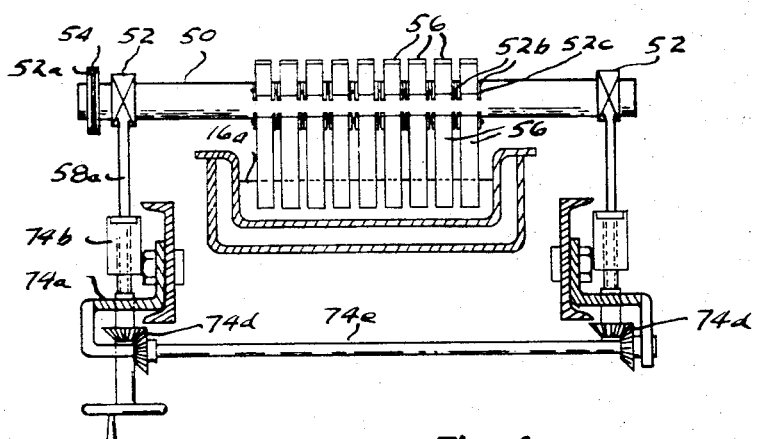

In the drawings:
FIG. 1 is a side elevational view of an apparatus for carrying out the invention;
FIG. 2 is a section through the conveyer element;
FIG. 3 is a schematic view of a safety control and cooling system; and
FIG. 4 is a section on the line 4—4 of FIG. 1.

Briefly, the invention contemplates loading the hot dross onto a cooling conveyer and carrying it into contact with a breaker which breaks the lumps into small particles whereby the cooling is accelerated. More specifically the conveyer is preferably of the type as shown in the Brumagin Patent 2,678,720 of May 18, 1954 and Patent 2,901,110 of Aug. 25, 1959, and is water-cooled. The breaker is a flail type of breaker, the arms of which act in opposition to the flow of the material. In addition the conveyer may have an abutment which minimizes the flail arms knocking the chunks backward too far on the conveyer. In addition some particles may be knocked against the abutment, thus facilitating the disintegration.

In the drawings the showing is largely diagrammatic and is for the purpose of illustrating one form that the invention may take, which is the preferred form. The apparatus for conveying the material illustrated is substantially the same as that illustrated in Patent 2,901,110 except that in this instance the upper perforated pan has been eliminated and legs or pedestals are shown for supporting the main frame. For a more detailed understanding of the construction reference may be had to said patent. For the purpose of this invention only the salient feature will be pointed out, including modifications of the conveyer pan.

As shown in FIG. 1, the base includes a plurality of pedestals 10 which support at their upper end a main frame 12. The lower ends of the pedestals may be provided with wheels 14 whereby the device may be made mobile. In the more permanent installations the wheels are omitted. A conveyer pan 16 is supported from the frame 12 by the supports 18 which have the springs 20–22 connected between the supports and the abutments 24 in the main frame 12. A mechanical vibrator of the rotary unbalanced type 26 is connected to the conveyer pan 16 and driven by a motor 28 through a variable speed drive 30 supported on the main frame, through a belt 31. The details of the above construction are shown in the above-mentioned patents.

With the above construction the conveyer pan, when the motor is energized, partakes of a movement in an upward and forward direction, which is to the right as viewed in the figure, followed by a return movement in a downward and backward direction. The material disposed on the pan is conveyed from the left to the right, as viewed in the figure.

Although the structure shown contemplates the vibrator being connected to the pan under the pan, suitable vibrating mechanism could be connected to the end of the pan, as shown in Patent No. 2,678,720, of May 18, 1954.

In either event, the material on the pan partakes of a movement as described above which causes a jumping conveying movement of the material on the pan from the left to the right end. The violence of this movement, and hence the conveying speed, is controlled by the speed of vibration which in turn is controlled by the variable speed drive transmission.

At this point attention is drawn to the fact that there are two variations from the pan shown in the previous patents, the one being that the pan is cooled by water and the other that the conveying surface of the pan is not a single plane horizontal surface but has a step or abutment in its midsection which cooperates with a flail later described in detail.

The cooling is effected by providing the pan 16 with a water jacket 16c, FIG. 2, which extends the length of the sides and bottom of the pan in spaced relation thereto. Cooling fluid, such as water, is admitted at one end through a flexible hose 32 at one end and removed through a similar flexible hose 34 at the other end. In the interest of saving water, the water may be circulated by a suitable pump 36 through a heat exchanger 38, FIG. 3, to provide the desired cooling of the water which is circulated through the water jacket. In certain locations it may be desirable to provide a heat exchanger that is refrigerated to cool the water and increase the efficiency.

It is also contemplated that suitable control means be provided in the cooling system to indicate the temperature of the water and to interrupt the operation of the motor should the water reach too high a degree of temperature. In FIG. 3 this is shown as being a bellows controlled thermostat with the adjustable bellows 40 disposed in the water line and operating a pair of switch contacts 42 disposed in the power line 44 connected to the motor 28. In addition, a pressure sensitive bellows 46 connected in the water line and having a rod connected to a switch 48 in the power line 45 may be used to shut off the motor if the pressure drops below a certain pressure.

It is pointed out that the water to the conveyor may be supplied at more than one point, such as indicated at 34a, FIG. 2, to provide a substantially uniform temperature throughout the length of the conveyor but that it is preferred that it be fed to the exit end of the conveyor, whereby the cooling is progressively greater from the entrance end toward the exit.

As previously mentioned, the conveyor is preferably provided with a step or abutment. This is shown at 16a in FIG. 1 in dotted lines and is formed by providing a raised portion 16b spaced above the other bottom portion of the conveyor pan and extending from the loading end toward the midsection. This portion of the bottom 16b may be parallel to the remainder of the pan or it may start at a lower level at the loading end and extend upward.

Means is provided, disposed in the path of flow of the dross on the pan, to strike the lumps of dross as they fall off the false bottom, at the step 16a, severe blows to cause it to further disintegrate. In the drawings this is shown as a flail which comprises a motor drive shaft having a plurality of arms pivoted on its periphery and rotated in a direction opposite to the path of travel of the dross so that the arms strike the dross and break it up into small particles. In this operation the disintegration is increased by the fact that the larger particles or lumps are knocked back against the step abutment 16a.

The flail is adjustable as to height above the pan 16 and as to its proximity to the abutment 16a. It is also mounted in such a manner that it can automatically rise away from the pan without damage, should something unbreakable be placed on the pan.

In the drawings a simplified construction is depicted. It will be appreciated that the drawings are for the purpose of disclosing one means for obtaining the results and that other structures could be used.

The flail structure is supported from the base frame and includes a shaft 50 mounted in journals 52 and rotated by a driven belt 54 extending around a pulley 52a. It extends transversely relative to the pan 16 and spaced from the abutment 16a. A plurality of flail arms 56 are pivotally secured to the periphery of the shaft. The mounting for the arms is illustrated as being lugs 52b extending outwardly from the shaft and pins 52c extending through the lugs and the ends of the arms. In its preferred form there are four sets of these arms and each set is disposed in a row lengthwise of the shaft 50. It is apparent that there could be only one or more rows of the arms. The diameter of the shaft 50 should be large enough to allow for the mounting of the arms and small enough that it does not interfere with the free swinging movement of the arms. The arms themselves should be of heavy stock, such that their impact against the dross is of a substantial nature and such that their weight and velocity causes the lumps to be knocked against the abutment 16a.

As best shown in FIG. 1, the shaft 50 is supported on the outer ends between the outer ends a pair of arms 58 pivotally journalled on a shaft 60 which in turn is supported by a pair of stanchions 62. The stanchions 62 are mounted on base brackets 64 each of which includes a vertically extending part 64a and a base part 64b. The brackets are disposed on opposite sides of the main frame 12. The vertical part of each bracket is provided with slots 64c through which bolts 64d extend, thus enabling the brackets to be adjusted longitudinally on the main frame 12 and to move the longitudinal position of the flail relative to the abutment 16a. One of the brackets is provided with a horizontal extension part 64e which provides a base on which a motor 66 and variable speed transmission 68 are mounted. They are connected by a coupling 67. The variable speed transmission is belted to one of the sheaves of a double sheave 70 by a belt 72. Thus, the flail may be adjustable as to its spacing from the abutment 62a.

The flail shaft and its arms may also swing in an arc about the shaft 60 by virtue of the pivoted supporting arms 58. The height of the flail arms from the bottom of the pan 16 is adjusted by a screw 74 which is supported by a bracket 74a on the bracket 64 and engages in a threaded sleeve 74b which is in interlocking engagement with a downwardly extending arm 58a which is integral with the arm 58. Preferably there should be one of the adjustment means on each side of the main frame to enable the flail height to be adjusted on both ends. The screws 74 on opposite sides are connected together by bevel gears 74d and a shaft 74e so that both ends of the flail may be adjusted from one side of the main frame.

Thus it is apparent that means is provided for adjusting the height of the flail as well as its proximity to the abutment 16a.

In addition, the speed of the flail may be adjusted to provide the desired impact of the arms against the dross. It is contemplated that the speed of movement of the dross along the conveyer be correlated with the speed of the flail to provide the desired breaking up of the dross lumps. Should a foreign object that cannot be broken be conveyed under the flail, the flail can rise by virtue of its pivotal connection, since the support arm 58a may move out of its interlocking connection with the screw sleeve 74b.

As best shown in FIG. 1, the dross from the furnace or reclamation pot may be dumped into the conveyer at the left end from a ladle L. If desired, a hopper 78 may be provided and the material passed down through to the conveyer. The dross lands on the sub-floor 16b of the conveyer pan which is being vibrated by the vibrator 26. Due to the mounting, the material is advanced along the conveyer in a series of jumps. The violence of the agitation may be controlled by the speed of the vibrator 26. The material moves along the sub-floor where some preliminary separation and distribution of the material is effected.

It is pointed out that the conveying speed should also be controlled according to the degree of heat of the material. The hotter the material, the slower the speed should be. The bouncing of the material along the floor provides a preliminary cooling and disintegration. The material then passes over end of the sub-floor and drops toward the main floor. The flail is, however, operating in close proximity to the abutment 16a with the arms 56 swinging violently toward the abutment. Therefore, the arms strike the material with considerable force and break the material up into fine particles. The speed of the flail is such and the spacing between the flail arms is such that only the finer particles pass beyond the arms. It will be appreciated that the rows of flail arms could be so positioned that the arms in one row were offset relative to those in another row, thus preventing channeling of the material. The result is that the hot lumps are broken up and cooled, thus terminating the exothermic reaction by cooling and resultant solidification of the molten metal. The finely divided particles are then discharged from the end into a tote box 80 by which it may be conveyed to a point where the material may be further processed or safely stored. The material may be subjected to further refinement process where the metallic aluminum is recovered, or used for other purposes.

The violent shaking of the dross causes a preliminary separation of the molten aluminum which solidifies on the cooling surface of the conveyer. The subsequent beating of the dross provides a further separation of the included aluminum which is finally cooled and may be readily removed from the comminuted dross. This is particularly useful since the skimming of the dross in the melting furnace is difficult to perform without some of the molten aluminum being included therein.

It is preferred that means be provided for the elimination of the dust that is generated during the disintegration of the material. To that end, a hood 82 is provided covering the conveyer and flail and is coupled to a suction means and a suitable separator of the well known cyclone or tuyere type, where the dust is recovered and various products subsequently reclaimed.

Such a hood is shown diagrammatically in FIG. 1 and constitutes a portion covering the charging end of the conveyer and supported by the main frame 12. It may have a pair of top doors 82a that may be opened to obtain access to the charging end. An enlargement 85 is provided for the flail and at the discharge end the cover 86 is provided with a hood 86a which connects to a duct 86b and to the separator not shown, a suitable fan 88 may be disposed in the duct, if desired.

Having thus described the invention in an embodiment thereof, it will be apparent that numerous and extensive departures may be made from the basic disclosure without departing from the spirit or the invention as defined in the appended claims.

We claim:

1. In apparatus for disintegrating and cooling a material such as dross or slag including a cooling conveyer for conveying the material from one end to the other, means disposed in the path of the material on the conveyer for applying flail like impacts to the material in the direction opposite to that in which it is conveyed, said impact means being intermediate the ends of the conveyer and displaced from the discharge end of the conveyer a distance such that the disintegrated material will have enhanced cooling during its travel along a substantial portion of the conveyer.

2. A device as described in claim 1, wherein the conveyer is fluid cooled.

3. A device as described in claim 1, wherein the means for impacting the material is a flail.

4. A device as described in claim 1, wherein the conveyer is of the vibratory type.

5. A device as described in claim 1, wherein the conveyer is provided with an abutment and the impact means is disposed to knock the pieces being impacted toward the abutment.

6. A device as described in claim 1, wherein said impact means comprises spaced apart arms and shaft means supporting said arms and driving them in the opposite direction to the flow of the material.

7. An apparatus for disintegrating and cooling aluminum dross comprising a vibratory conveyer having a loading and a discharging end which vibratory movement causes the material to move from one end to the other thereof, means disposed in the path of the material to impact the material and break it up into small pieces comprising a rotary flail having arms which are swung into a direction opposite to the path of the material, said flail being disposed intermediate the ends of the conveyer.

8. An apparatus as described in claim 7, wherein said conveyer is provided with a fluid cooling jacket and cooling fluid is circulated through said jacket.

9. An apparatus as described in claim 7, wherein said conveyer is provided with a step displaced from the loading end and said material is conveyed along the conveyer over said step.

10. An apparatus as described in claim 9, wherein said impact means comprises a rotary flail having arms for impacting the material after it passes over the step.

11. An apparatus as described in claim 10, wherein means is provided for supporting the flail and adjustable as to height above the floor of the conveyer and in proximity to said step.

12. An apparatus for cooling and comminuting aluminum dross including a vibratory conveyer means to drive said conveyer at a variable speed, said conveyer having a loading and a discharge end, means for cooling the conveyer, said conveyer having an abutment extending above the floor of the conveyer spaced from the loading end, means for impacting the material being conveyed comprising a flail adjustably mounted as to height above the floor and proximity to said abutment, variable speed means for driving the flail in a direction to impact the material passing over the abutment and in a direction opposite to the passage of the material along the conveyer.

13. An apparatus for disintegrating and cooling dross comprising a horizontal vibratory conveyer which partakes of a cyclical movement upward and forward and backward and downward, said conveyer having a first portion providing a level above a succeeding portion, the place where the level changes providing an abutment, means connected to the conveyer to vibrate it, control means connected to the vibratory means to control the speed of vibration, an impact means disposed beyond the abutment and arranged to provide an impact to the larger pieces of material on the conveyer in a direction opposite to the path of travel of the material on the conveyer, support means for said impact means to adjust the level of the impact means above the floor of the conveyer.

14. An apparatus as described in claim 13, wherein said support means is arranged to adjust the impact means in relation to said abutment to cause said pieces to be knocked toward the abutment.

References Cited

UNITED STATES PATENTS

| | | | |
|---|---|---|---|
| 2,885,157 | 5/1959 | Fegely | 241—65 |
| 3,252,276 | 5/1966 | Brewer | 241—194 |

FOREIGN PATENTS 710,320  5/1965  Canada.

GERALD A. DOST, *Primary Examiner.*

U.S. Cl. X.R.

241—23, 65